US 6,639,160 B2

(12) United States Patent
Ibe et al.

(10) Patent No.: US 6,639,160 B2
(45) Date of Patent: Oct. 28, 2003

(54) STEERING SWITCH ASSEMBLY STRUCTURE

(75) Inventors: Shoichi Ibe, Niwa-gun (JP); Keisuke Imai, Niwa-gun (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 85 days.

(21) Appl. No.: 09/977,992

(22) Filed: Oct. 17, 2001

(65) Prior Publication Data

US 2002/0046936 A1 Apr. 25, 2002

(30) Foreign Application Priority Data

Oct. 19, 2000 (JP) ........................................ 2000-319149

(51) Int. Cl.⁷ ............................................... H01H 9/00
(52) U.S. Cl. ............................... 200/61.54; 200/61.57; 341/20
(58) Field of Search .......................... 200/61.54, 61.55, 200/61.57; 280/728.2, 731; 74/552, 484 R; 341/20, 22; 340/425.5

(56) References Cited

U.S. PATENT DOCUMENTS 4,872,364 A  * 10/1989  Kaga et al. ............... 74/484 H
5,023,412 A  *  6/1991  Ishida ..................... 200/61.54
5,508,481 A  *  4/1996  Williams et al. ......... 200/61.54
5,947,509 A  *  9/1999  Ricks et al. ............. 280/728.2
6,086,090 A  *  7/2000  Fischer .................... 280/728.2
6,312,012 B1 * 11/2001  Bohn et al. ................ 280/731

* cited by examiner

Primary Examiner—Karl D. Easthom
Assistant Examiner—Kyung Lee
(74) Attorney, Agent, or Firm—Nixon Peabody LLP; Thomas W. Cole (57) ABSTRACT

A steering switch assembly structure which facilitates mounting of a pad member and switch assemblies to a metal core of a steering wheel, and which reduces assembly steps and is low in cost. The pad member is disposed between first leg pieces and second leg pieces on a bracket, compression coil springs are arranged between mount pieces of the pad member and the second leg pieces. In this state, the first leg pieces are inserted into mount slots of the switch assemblies. When the mount pieces are moved against elastic force of the springs and brought into contact with horn contacts, a horn device is actuated. The pad member is engaged by bottom surfaces of the switch assemblies, and is prevented from falling off the bracket, which is secured to the metal core, in a direction of separation from the bracket, without use of any further fastening means.

22 Claims, 6 Drawing Sheets

STEERING SWITCH ASSEMBLY STRUCTURE

BACKGROUND OF THE PRESENT INVENTION

1. Field of the Present Invention

The present invention relates to an assembly structure by which a pad member, which serves as an operation switch for an alarm horn device, and switch assemblies at a peripheral edge of the pad member are mounted to a steering device on a vehicle.

2. Description of the Prior Art

Steering devices include one provided with an airbag device. In such a steering device, a bag body, an inflator and the like, which constitute the airbag device, are housed in a pad member, and the pad member is mounted to a metal core of a steering wheel.

In view of reduction in the number of parts and assembly steps, there is a steering device in which the above-mentioned pad member serves as an operation switch for an alarm horn device. With such a steering device, the pad member is detachably mounted on the metal core, with coil springs between it and the metal core, and displacement of the pad member relative to the metal core causes alarm contacts to be closed so that an alarm is issued from the alarm horn device. The pad member and the metal core are connected to each other to be capable of displacement, such as by threading male screws into female threads provided in a base plate of the pad member in a state in which the male screws are inserted through holes provided in the metal core, heads of the male screws are engaged by peripheral edges of the holes, and the male screws are inserted through coil springs.

Further, in addition to the above-mentioned operation switch for an alarm horn device, to meet needs of consumers in recent years, there have been arranged in a steering wheel of a steering device switches of added value, such as a switch for audio appliances, a switch for operation of a car navigation system, and a shift switch. Such switches of added value are usually arranged in a pair of switch assemblies disposed in substantially left-right symmetric positions on an inner periphery of the steering wheel, and fixed and held on the metal cores by bolts and nuts, for an occupant to operate them while holding the steering wheel.

However, with the above-mentioned steering device, since the pad member (base plate) is mounted on the metal core by fasteners such as bolts and nuts or the like, there is caused a problem that assembly work is complicated and there are many steps, which leads to high cost. In particular, with a steering device having switch assemblies, the switch assemblies are also fixed and held by metal core fasteners, so that the assembly work is further complicated, leading to a further increase in cost.

SUMMARY OF THE PRESENT INVENTION

The present invention has been thought of in view of the above-mentioned disadvantages and has an object to provide a steering switch assembly structure which facilitates mounting of a pad member and switch assemblies to a metal core of a steering wheel, and which reduces assembly steps and is low in cost.

In accordance with the present invention there is provided a steering switch assembly structure including: a metal core of a steering wheel having a first leg piece and a second leg piece spaced a predetermined distance from the first leg piece; a horn pad having a projection capable of translatory reciprocal movement between the first leg piece and the second leg piece; an elastic element interposed between the projection and the second leg piece for urging the projection in a direction of the reciprocal movement toward the first leg piece; and a switch assembly mounted at the first leg piece and against which the projection is caused to constantly abut by urging of the elastic element.

In another aspect of the present invention, there is provided a steering switch assembly structure including: a metal core of a steering wheel; a bracket having a first leg piece and a second leg piece spaced a predetermined distance from the first leg piece, the bracket being fixed to the metal core; a horn pad having a projection capable of translatory reciprocal movement between the first leg piece and the second leg piece; an elastic element interposed between the projection and the second leg piece for urging the projection in a direction of the reciprocal movement toward the first leg piece; and a switch assembly mounted at the first leg piece and against which the projection is caused to constantly abut by urging of the elastic element.

In a further aspect of the present invention, there is provided a steering switch assembly structure comprising: a metal core of a steering wheel; a bracket mounted to the metal core; a switch assembly; and a non-screwing (threadless) fastener for mounting the switch assembly to the bracket.

DESCRIPTION OF THE PREFERRED EMBODIMENT

An embodiment of the present invention will be described below with reference to FIGS. 1 to 6B.

Figure 1:
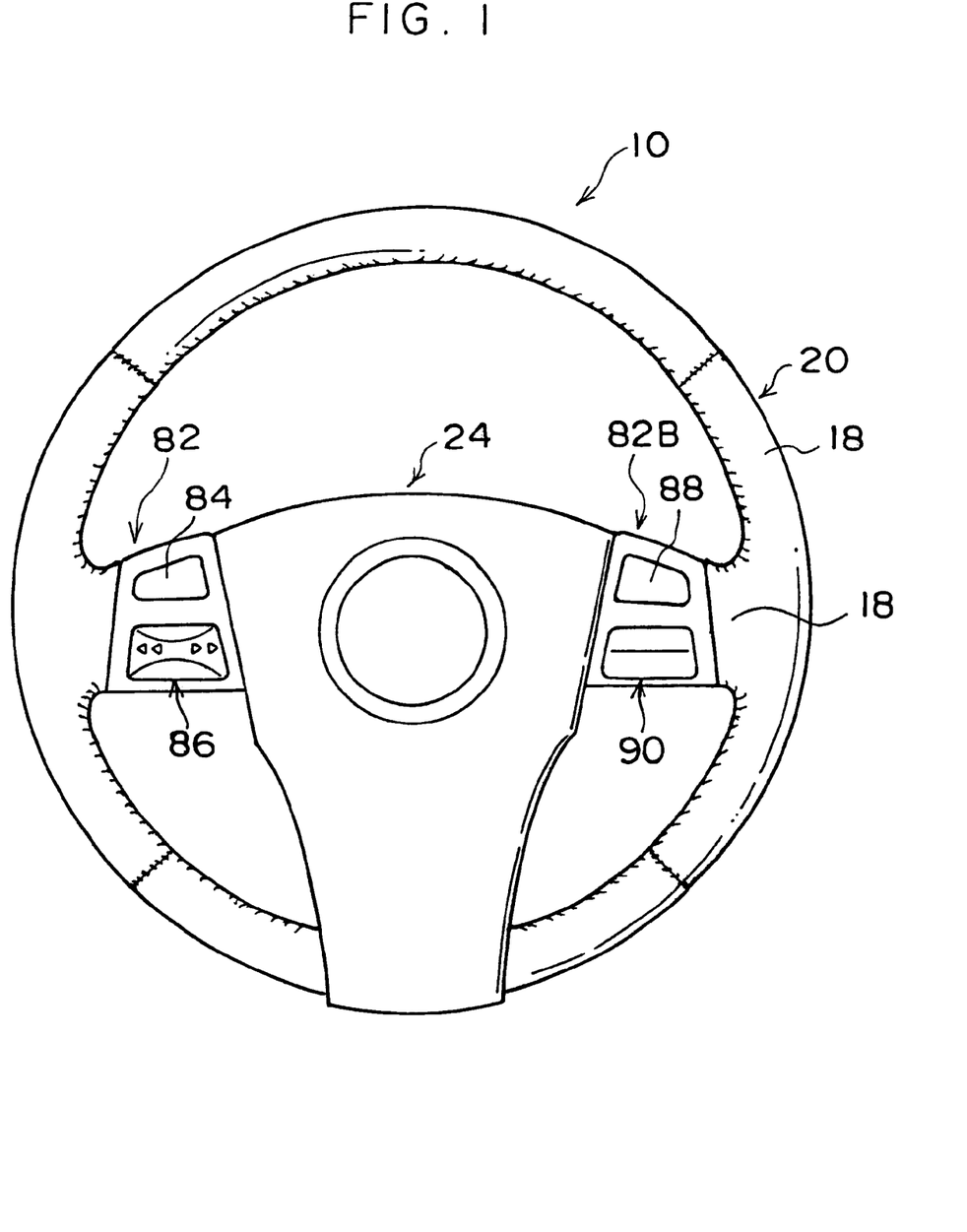
FIG. 1 is a front view showing a steering device into which an assembly structure for steering switches according to an embodiment of the present invention is incorporated.
Figure 2:
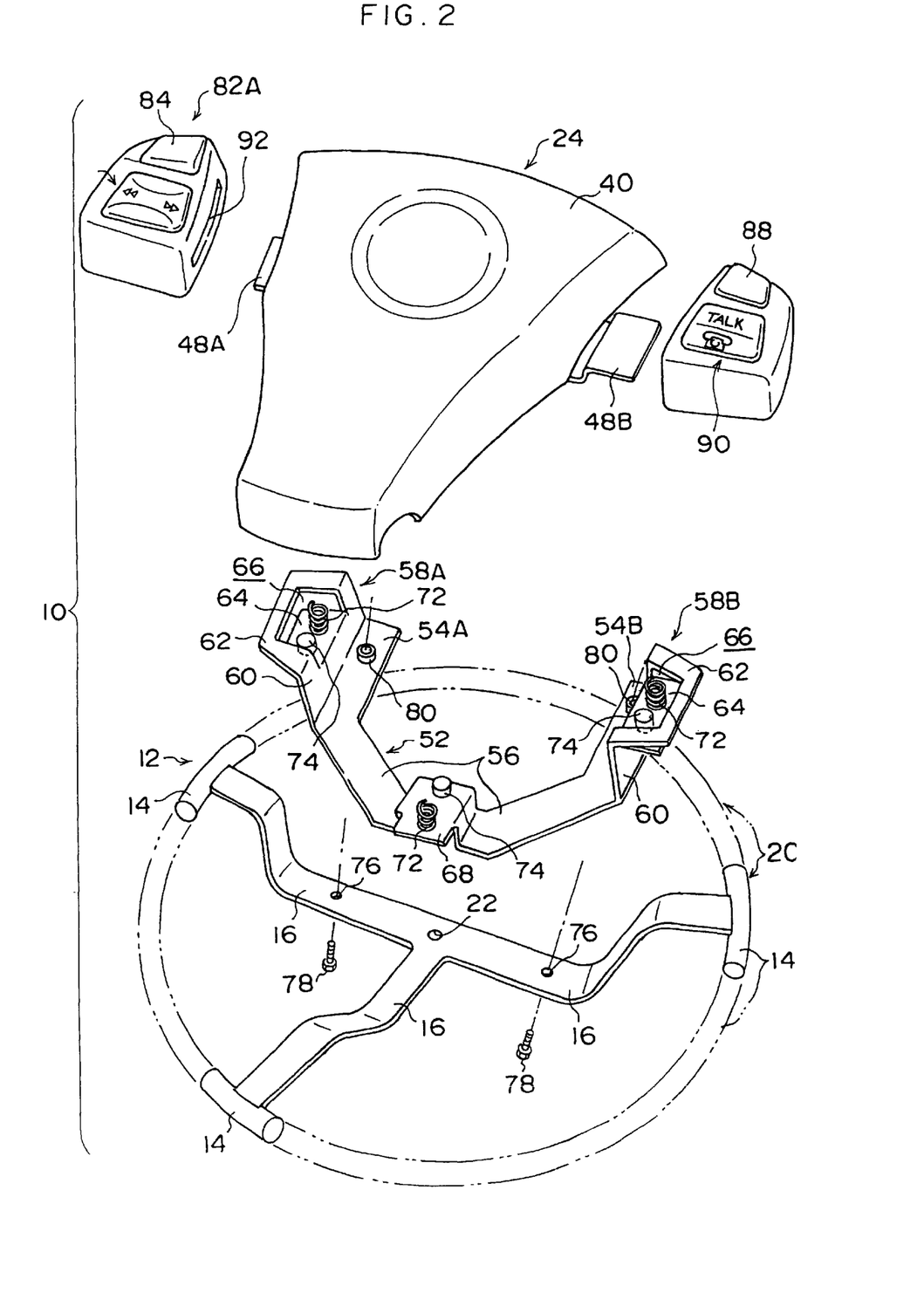
FIG. 2 is an exploded perspective view showing the steering device of FIG. 1.

As shown in FIGS. 1 and 2, a steering device 10 is provided with a metal core 12. The metal core 12 has a ring-shaped (partly broken in FIG. 2) rim-side metal core 14 and a plurality (three in the embodiment) of spoke-side metal cores 16 lengthwise along substantially radial directions of the rim-side metal core 14. An outer skin 18 made of a urethane resin, leather or the like is wound outside of the rim-side metal core 14 to form a steering wheel 20. Also, the respective spoke-side metal cores 16 are extended diametrically inwardly and toward one side in an axial direction of the rim-side metal core 14 (opposite side to an occupant's side), and connected to one another at a position offset from a center of the rim-side metal core 14 toward the above-mentioned opposite side to the occupant's side in the axial direction of the rim-side metal core 14. The outer skin 18 is also formed on the spoke-side metal cores 16. Further, a substantially cylindrical-shaped boss hole 22 coaxial with the rim-side metal core 14 is provided at a connection of the respective spoke-side metal cores 16 along the axis of the rim-side metal core 14. A tip end of a steering shaft (not shown) is inserted through and fixed to the boss hole 22 whereby steering of a vehicle is made possible upon rotation of the steering wheel 20.

Figure 3:
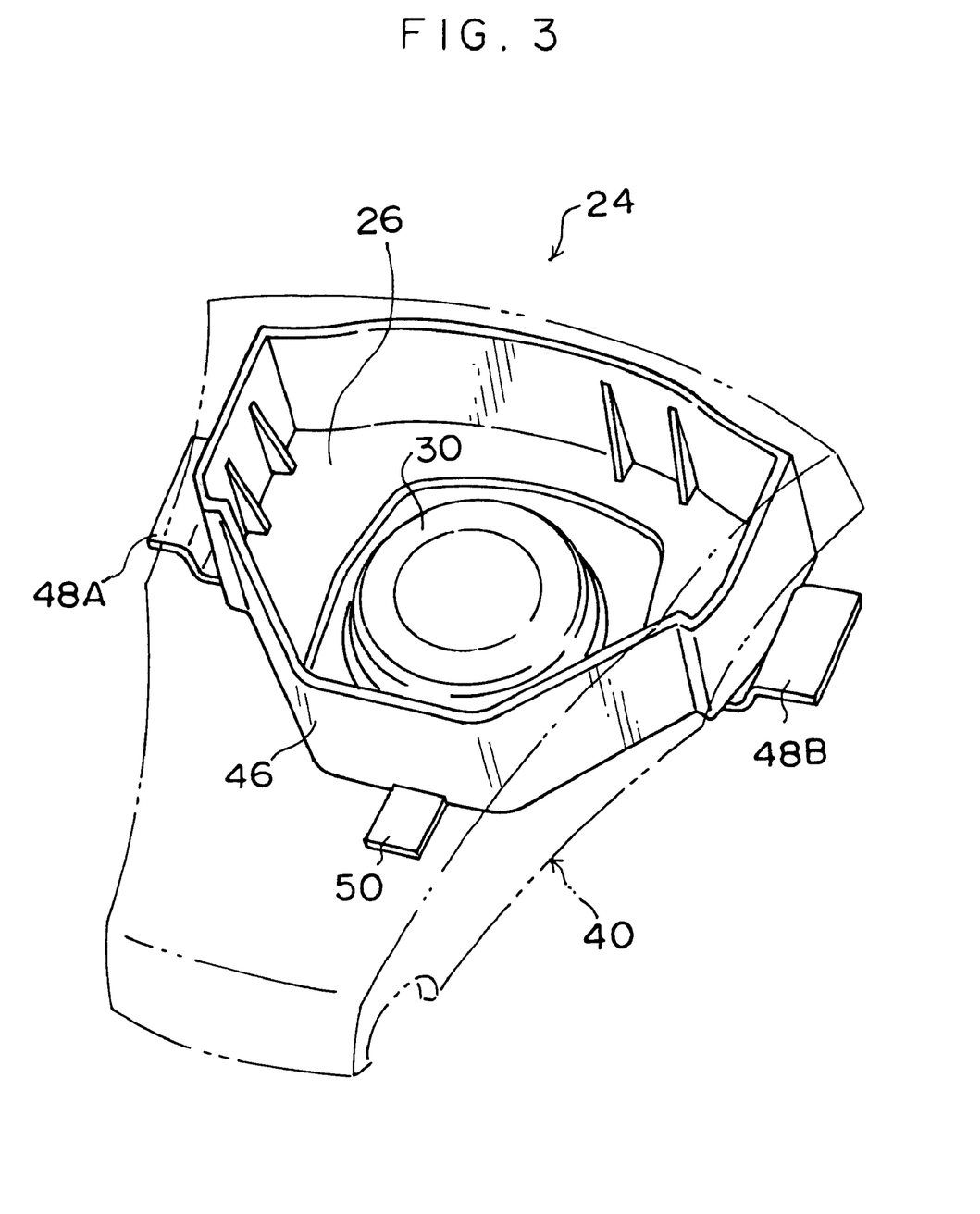
FIG. 3 is a perspective view showing a pad member.
Figure 4:
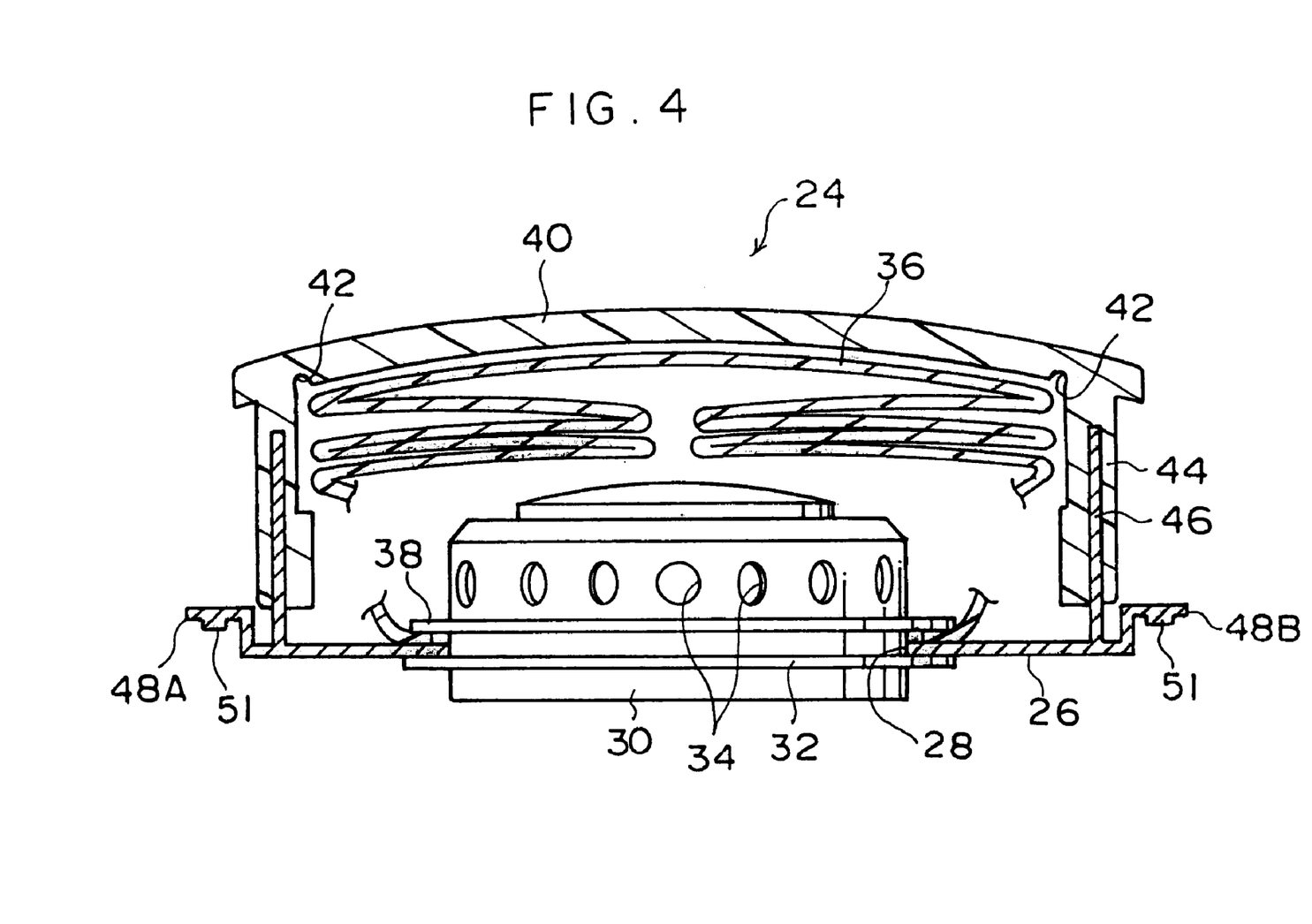
FIG. 4 is a cross sectional view showing the pad member.

A pad member 24 is arranged inside of the steering wheel 20 and on the occupant's side in an axial direction of the boss hole 22. As shown in FIGS. 3 and 4, the pad member 24 is provided with a flat-shaped metallic base plate 26, which extends thicknesswise along an axial direction of the steering wheel 20. The base plate 26 is formed with a mount hole 28 substantially at the center thereof, through which a substantially cylindrical-shaped inflator 30 is inserted and arranged. Extending outside from an axially intermediate portion of the inflator 30 is a flange portion 32, which is fastened to and fixed to the base plate 26 by means of a fastening means such as bolts or the like. The inflator 30 accommodates therein respective members (not shown) such as a start device, a detonator, a booster material, a gas generating agent, a filter and the like, so that if the vehicle is put in a rapid decelerating condition, the start device is actuated by a signal from an acceleration sensor (not shown) mounted on the vehicle body to ignite the detonator to burn the gas generating agent through the booster material to generate a large amount of a gas. Further, the filter is used to cool the gas and remove broken pieces, and the gas is made to spout from a plurality of gas holes 34 formed on an outer periphery of the inflator 30.

A bag body 36 is disposed in a folded state on the occupant's side of the inflator 30. The bag body 36 is a bag-shaped member opened toward the inflator 30 and is fastened and fixed to the base plate 26 by means of a fastening means such as bolts or the like in a state in which the bag body 36 covers the inflator 30 and a peripheral edge of the opening is gripped by a ring plate 38.

A pad cover 40 is arranged on the occupant's side of the bag body 36 in a manner to cover the bag body 36. The pad cover 40 is caused by a pushing force of a predetermined value or more from the occupant's side to make elastic deformation toward the opposite side and has an elastic force by which it is returned to an original configuration when the pushing force is released. The pad cover 40 is formed at a predetermined portion thereof with a thin-walled burst line 42, which is thinner than other portions. The portion at which the burst line 42 is formed is smaller in mechanical strength than the other portions, and is constructed such that when the bag body 36 expanded by the gas from the inflator 30 pushes the pad cover 40 from the opposite side to the occupant's side, the burst line 42 breaks to allow the pad cover 40 to open toward the occupant's side.

The pad cover 40 is formed with frame portions 44, which extend toward the base plate 26. The frame portions 44 are fastened and fixed to wall portions 46, which are provided upright on an outer periphery of the base plate 26, by means of rivets, bolts or the like to be made integral with the base plate 26. The pad cover 40 is constructed to extend downward as viewed by the occupant (in a direction into the paper of the drawing of FIG. 1) to cover a lower end of the steering wheel 20.

As shown in FIG. 3, a pair of mount pieces 48A and 48B and a mount piece 50 are provided in positions, respectively, substantially opposite to the three metal cores 16 on the spoke side of the base plate 26 to be made integral with the base plate 26. The mount pieces 48A and 48B are shaped to be substantially left-right symmetric with the inflator 30 therebetween, and each of the mount pieces 48A and 48B is made slightly upright along the wall portions 46 on the outer periphery of the base plate 26, bent substantially at right angles in the vicinity of ends at which the frame portions 44 of the pad cover 40 are fixed, and extended outside of the wall portions 46.

Figure 6A:
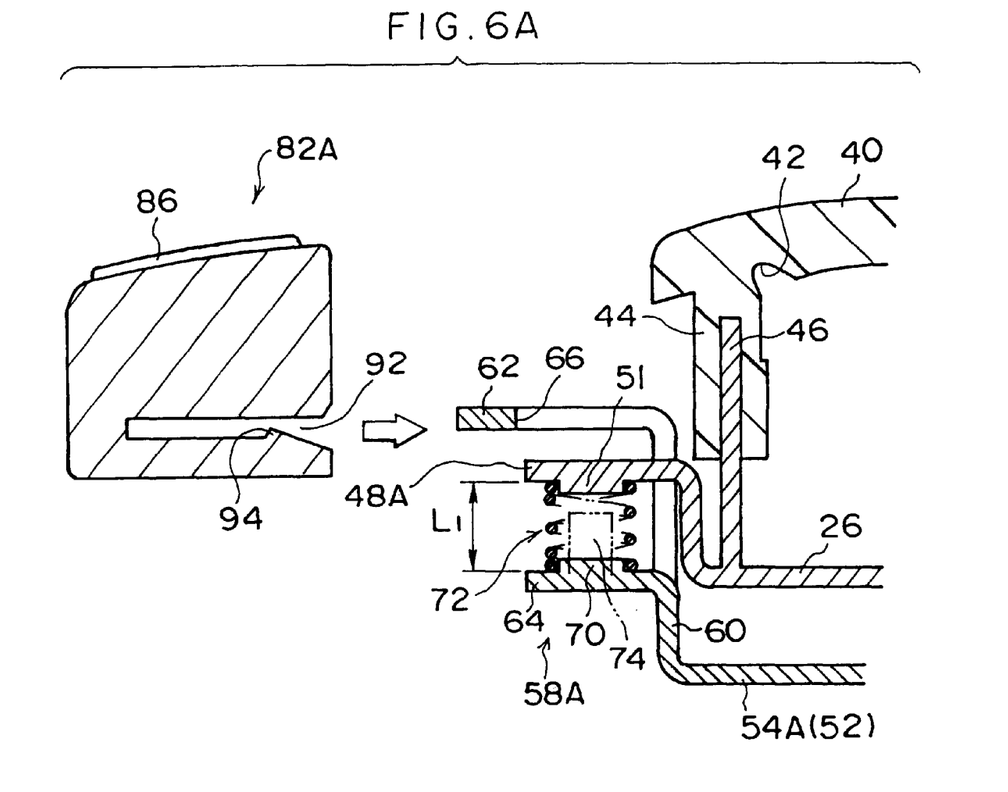
FIG. 6A is a cross sectional view showing a state prior to mounting of the pad member and the switch assembly to a bracket.
Figure 6B:
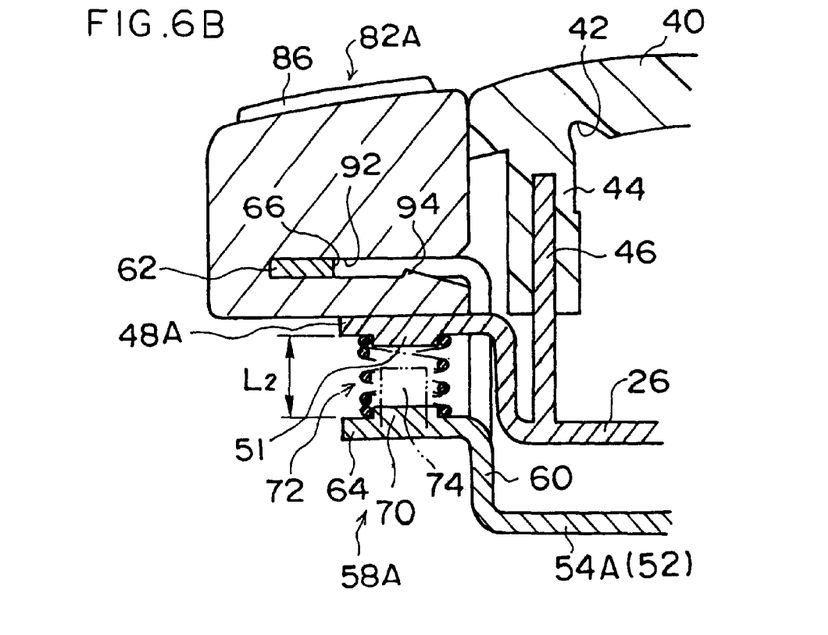
FIG. 6B is a cross sectional view showing a state in which the pad member and the switch assembly are mounted to the bracket.

The mount piece 50 is in the form of a flat plate along the base plate 26 to be extended outside of the wall portions 46 the near side of and below the base plate 26 as viewed by the occupant. As shown in FIGS. 6A and 6B, short column-shaped spring seat projections 51 for holding compression coil springs 72 described later are provided on a side of the mount pieces 48A and 48B and the mount piece 50 toward the metal core 12.

A metallic bracket 52 is arranged between the pad member 24 and the metal core 12. The bracket 52 is provided with opposing legs 54A and 54B and a connection 56, which connects the legs to each other and is substantially C-shaped to be opened upward and away as viewed by the occupant. Pad supports 58A and 58B are provided in positions at the tip ends of the legs 54A and 54B, corresponding to the mount pieces 48A and 48B of the pad member 24.

The pad supports 58A and 58B each has an upright wall 60 provided upright from the legs 54A and 54B, a first leg piece 62 extended outward at a substantial right angle from an upper end of the upright wall 60, a second leg piece 64 extended outward substantially parallel to the first leg piece 62 from an intermediate portion of the upright wall 60, and a notch 66 through which one of the mount pieces 48A and 48B of the pad member 24 can pass. In assembly, the respective second leg pieces 64 face the mount pieces 48A and 48B of the pad member 24.

Formed at the connection 56 of the bracket 52 is a pad support 68, which is formed by bending of a plate to be shaped in the form of a platform. In assembly, the pad support 68 is opposed to the mount piece 50 of the pad member 24. The bracket 52 is preferably formed by bending of a single plate. Specifically, the pad supports 58A and 58B are constructed such that downwardly open C-shaped cuts are made in intermediate portions of the upright walls 60 and the upper ends and intermediate portions of the upright walls 60 are bent to enable easy forming of the first leg pieces 62, the second leg pieces 64 and the notches 66.

Short column-shaped spring seat projections 70 having substantially the same dimensions as the spring seat projections 51 are formed in positions on the respective second leg pieces 64 and the pad support 68 which face the spring seat projections 51 provided on the mount pieces 48A, 48B and 50 of the pad member 24, and the compression coil springs 72 are disposed around the spring seat projections 70. The compression coil springs 72 have inner diameters slightly larger than outer diameters of the respective spring seat projections 51 and 70, and the provision of the respective spring seat projections 51 and 70 prevents the springs from falling off. Spring seat grooves having an inner diameter slightly larger than an outer diameter of the compression coil springs 72 may be provided in place of either or both of the spring seat projections 51 and 70.

As described above, the pad member 24 is loaded on the second leg pieces 64 of the bracket 52 and the pad support 68 with the compression coil springs 72 and the mount pieces 48A, 48B and 50 therebetween. Horn contacts 74 are respectively provided near the compression coil springs 72 on the respective second leg pieces 64 and the pad support 68. When the pad member 24 is pushed against the urging of the compression coil springs 72, at least one of the mount pieces 48A, 48B and 50 can be brought into contact with the corresponding horn contact 74.

The bracket 52 is fixed integrally to the metal cores 16 by threading bolts 78, heads of which engage through holes 76 formed in the metal cores 16 and threaded portions of which can pass through the through holes 76 into female threads of mount bosses 80 provided in the vicinity of the pad supports 58A and 58B.

The horn contacts 74 are electrically connected to a battery grounded to a vehicle body via the bracket 52, the metal core 12 and the vehicle body. The base plate 26 provided with the mount pieces 48A, 48B and 50 is electrically connected to the battery via an alarm horn device (not shown).

As understood from the above explanation, the pad member 24 possesses the function of an operating switch for the alarm horn device.

Figure 5A:
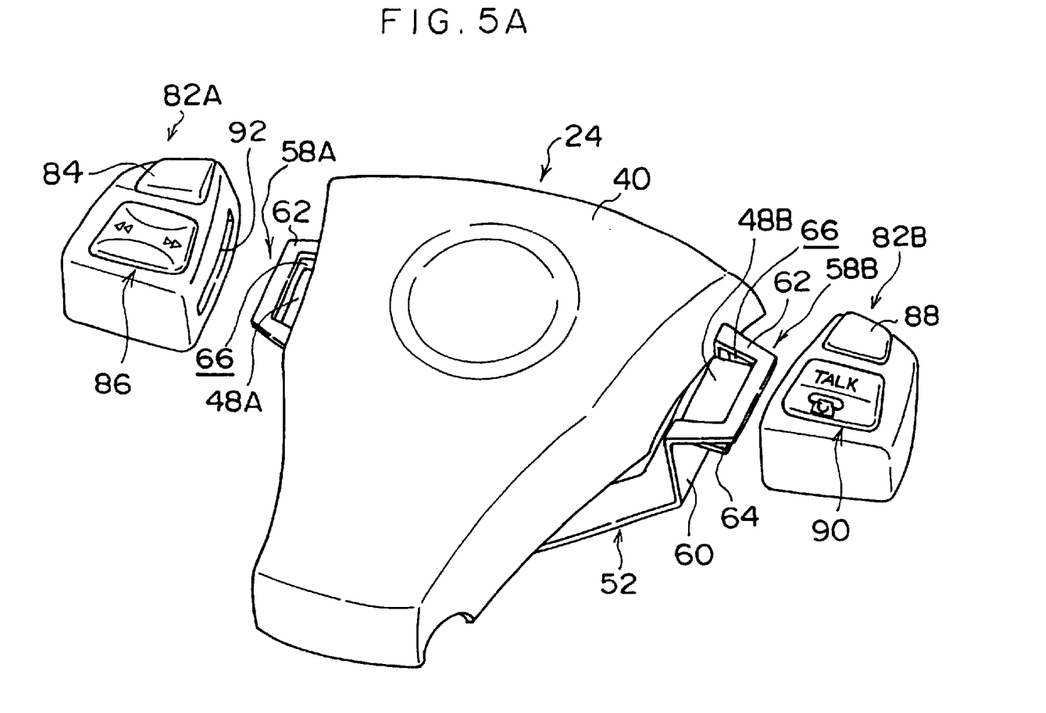
FIG. 5A is a perspective view showing a state prior to mounting of the pad member and a switch assembly.
Figure 5B:
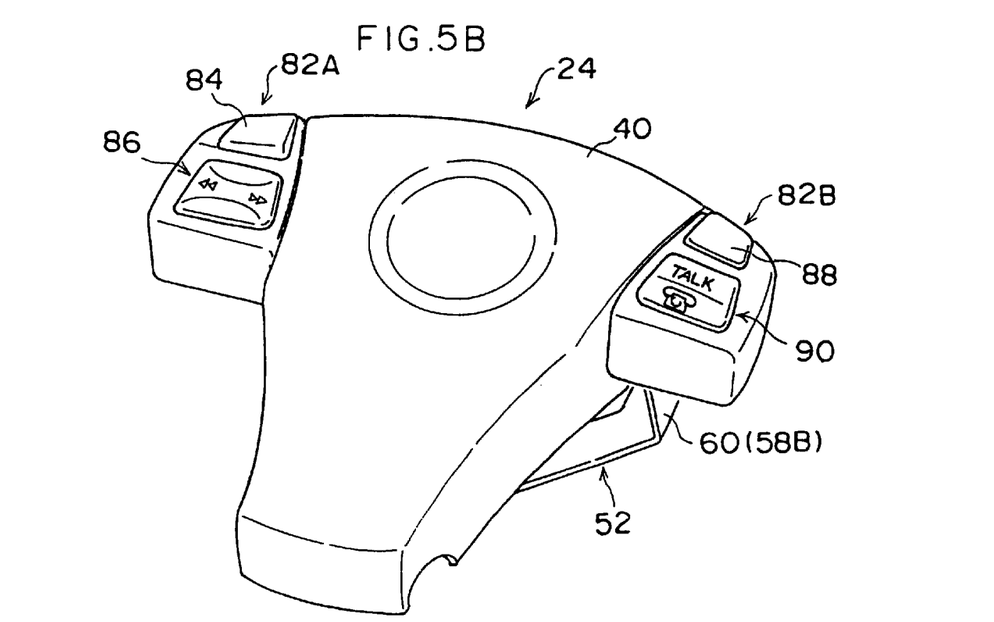
FIG. 5B is a perspective view showing a state in which the pad member and the switch assembly are mounted.

As shown in FIGS. 5A and 5B, switch assemblies 82A and 82B are arranged on both sides where the mount pieces 48A and 48B of the pad member 24 are provided. Arranged on the switch assembly 82A disposed on a left side as viewed by the occupant are a shift-down switch 84 on a far side (upper) and a switch group 86 for operation of audio appliances on the near side (lower). Arranged on the switch assembly 82B disposed on a right side as viewed by the occupant are a shift-up switch 88 on the far side (upper) and a switch group 90 for operation of an on-board telephone on the near side.

As shown in detail in FIG. 6A, mount slots 92 (non-screwing or threadless fasteners) are provided in the switch assemblies 82A and 82B disposed downward in the axial direction of the metal core 12. The mount slots 92 are formed to correspond to an outer shape of the first leg pieces 62 of the bracket 52. In a mounted position, the first leg pieces 62 are inserted into the mount slots. Also, pawls 94 are integrally formed at lower edges near open ends of the mount slots 92 to releasably engage with edges of the notches 66 of the first leg pieces 62. At the time of such engagement, the first leg pieces 62 are fixed in the mount slots 92.

In a state in which the first leg pieces 62 of the bracket 52 are inserted into the mount slots 92, lower end surfaces of the respective switch assemblies 82A and 82B are engaged by surfaces of the mount pieces 48A and 48B on a side opposite to a side of the pad member 24 at which the compression coil springs 72 are disposed (surfaces on an occupant's side). In this state, the respective parts are designed such that the compression coil springs 72 are compressed a predetermined amount (a dimension obtained by subtracting L2 from L1 shown in FIGS. 6A and 6B, at which dimension the mount pieces 48A and 48B do not come into contact with the horn contacts 74).

Having been attached to the steering device 10, the respective switch assemblies 82A and 82B abut against the outer skin 18 provided on end portions of the metal cores 16 at sides of the steering wheel 20, so that the switch assemblies 82A and 82B are prevented from falling off in a detaching direction (a direction perpendicular to the axis of the metal core 12). Also, the compression coil springs 72 are designed to apply urging to the pad member 24 at all times, and so generation of backlash on the pad member is prevented, as compared with a structure in which urging is not applied at all times.

The pad member 24 and the switch assemblies 82A and 82B in the embodiment constitute a "steering switch" in the present invention.

The embodiment will be described below with respect to its operation.

With the steering device 10, when the pad member 24 is pushed toward the side of the metal core 12 from the occupant's side, the compression coil springs 72 are deformed and the mount pieces 48A, 48B and 50 come into contact with the horn contacts 74 to actuate the alarm horn device.

If the acceleration sensor detects a predetermined acceleration, a large amount of the gas generates from the inflator 30 to cause the bag body 36 to break the pad cover 40 and expand to the occupant's side.

An outline of assembling work for the steering device 10 is as follows.

The compression coil springs 72 are first placed on the pad supports 58A and 58B and the pad support 68 of the bracket 52 (see FIGS. 5A and 6A).

Subsequently, with the compression coil springs 72 compressed, the respective first leg pieces 62 on the pad supports 58A and 58B of the bracket 52 are inserted into the mount slots 92 of the switch assemblies 82A and 82B, respectively. Thereby, the switch assemblies 82A and 82B permit upper and lower surfaces in the mount slots 92 to engage with both sides (the occupant's side and the opposite side thereto) of the respective first leg pieces 62 of the bracket 52 and permit the lower end surfaces of the switch assemblies 82A and 82B to engage with surfaces of the mount pieces 48A and 48B of the pad member 24 on the occupant's side.

Thereby, mounting of the pad member 24 and the switch assemblies 82A and 82B to the bracket 52 is completed, and with the compression coil springs 72 compressed the predetermined amount (the difference between L1 and L2 shown in FIGS. 6A and 6B), the respective switch assemblies 82A and 82B are prevented from moving in the axial direction of the metal core 12, and the pad member 24 is prevented from falling off the metal core 12 in the axial direction of the metal core 12.

Subsequently, the bracket 52 is mounted on the metal core 12. More specifically, the bolts 78 are inserted into the through holes 76 of the metal core 12 covered by the outer skin 18 from the opposite side to the occupant's side, heads of the bolts 78 are engaged at the through holes 76 and the threaded portions of the bolts 78 are threaded into the mount bosses 80 of the bracket 52. Thereby, mounting of the bracket 52 on the metal core 12 is completed.

Assembly of the steering device 10 is completed in the above manner.

In this state, the respective switch assemblies 82A and 82B are caused to abut against the outer skin 18 on the spoke-side metal cores 16, and so the bracket 52 is prevented from falling off in a direction opposite to the direction in which the first leg pieces are inserted. Also, side walls of the mount slots 92 prevent falling-off of the respective switch assemblies 82A and 82B in a direction perpendicular to the direction in which the first leg pieces are inserted (a vertical direction in FIG. 1).

In this manner, the switch assemblies 82A and 82B are mounted to the bracket 52 simply by inserting the first leg pieces 62 of the bracket 52 into the mount slots 92, and prevent falling-off of the pad member 24 from the metal core 12. Thereby, the steering device 10 dispenses with fastening elements such as screws, bolts and nuts, or the like in the assembly process of the pad member 24 and the switch assemblies 82A and 82B to enable remarkably reducing assembly steps and manufacturing cost.

Also, since the switch assemblies 82A and 82B are prevented from moving in the axial direction of the metal core 12, compressive deformation of the compression coil springs 72 due to depressing operations of various switches (for example, the shift-up switch 88) arranged on the switch assemblies is prevented. Therefore, accidental operation of the alarm horn device accompanying the operation of various switches is prevented.

Further, since the compression coil springs 72 are compressed the predetermined amount, urging acts on the pad member 24 in a direction in which it is separated from the metal core 12 and also on the switch assemblies 82A and 82B, which engage with the mount pieces 48A and 48B of the pad member 24. Thereby, the pad member 24 and the switch assemblies 82A and 82B are further surely and stably mounted on the metal core 12 (the bracket 52) by the urging of the compression coil springs 72 without backlash.

Further, since the switch assemblies 82A and 82B are provided with the pawls 94, which are capable of engaging with the edges of the notches 66 of the first leg pieces 62 on the bracket 52, falling-off of the switch assemblies 82A and 82B from the bracket 52 at the time of mounting of the bracket 52, to which the pad member 24 and the switch assemblies 82A and 82B are mounted, to the metal core 12 and damage caused thereby are prevented. Therefore, precise work is not required at the time of assembly of the steering device 10 and so the assembly work is further facilitated. While the edges of the notches 66 and the pawls 94 are normally separated from each other in FIG. 6B, it goes without saying that the notches 66 and the pawls 94 may be structured to engage with each other at all times. In this case, the pawls 94 preferably engage in a state of elastic deformation with the notches 66.

Also, since the pad member 24 and the switch assemblies 82A and 82B are mounted to the metal core 12 through the bracket 52 separate from the metal core 12, it is possible to constitute the pad member 24, the switch assemblies 82A and 82B and the operating section of the alarm horn device as a single module. Therefore, such modules can be mounted to the metal cores 12 having various configurations without modification in designs of the metal cores 12. The above-mentioned module of one kind can be mounted to the metal cores 12 of several kinds through modification of the configuration of the bracket 52, which leads to a further reduction in cost. On the other hand, several kinds of the above-mentioned modules can be mounted to the metal core 12 of one kind (making the metal core 12 common to various applications). Further, in the case where an energy absorbing structure (a structure adapted to be deformed to absorb energy when shock of a predetermined value or more is applied from the occupant's side) possessed normally by the metal core 12 is provided at the bracket 52, the metal core 12 is not required to posses any energy absorbing structure. Thus, modifications in design of the metal core 12 entailed in absorption of energy and accompanying adoption of the steering switch assembly structure according to the present invention are dispensed with, and so an existing metal core 12 can be applied as is to enable further reducing of cost.

In addition, while the metal core 12 has three spoke-side metal cores 16 in the embodiment, the present invention itself is not limited thereto and, for example, the metal core 12 may have two or four or more spoke-side metal cores 16.

In this case, the first leg pieces 62 and the second leg pieces 64 may be provided directly (integrally) on the metal core 12.

Also, while the steering device 10 is provided with the bracket 52 in the above-described embodiment, the present invention is not limited thereto, and so may be constructed to be provided with no bracket 52. In this case, the first leg pieces 62 and the second leg pieces 64 can be provided directly on the metal core 12.

Further, while the switch assemblies 82A and 82B include the shift-down switch 84, the switch group 86 for operation of audio appliances, the shift-up switch 88 and the switch group 90 for operation of an on-board telephone, the present invention is not limited thereto, and, for example, the switch assemblies 82A and 82B can be constructed to be provided with a switch for operation of an air conditioner, a switch for operation of a car navigation system, a switch for operation of a cruise control device, or the like, in place of the above respective switches or together with a part or all of the above respective switches.

Further, while the pad member 24 houses therein an airbag device (the inflator 30, the bag body 36 and so on), the present invention is not limited thereto, and the pad member 24 may be an operating switch for the alarm horn device in which an airbag device is not housed.

What is claimed is:

1. A steering switch assembly structure comprising:
   a metal core of a steering wheel having a first leg piece and a second leg piece spaced a predetermined distance from the first leg piece;
   a horn pad having a projection capable of translatory reciprocal movement between the first leg piece and the second leg piece;
   an elastic element interposed between the projection and the second leg piece for urging the projection in a direction of the reciprocal movement toward the first leg piece; and
   a switch assembly mounted at the first leg piece and against which the projection is caused to constantly abut by urging of the elastic element.

2. The steering switch assembly structure according to claim 1, wherein a direction in which the horn pad and the projection reciprocate and a direction in which the urging acts are both substantially parallel to a central axis of the metal core.

3. The steering switch assembly structure according to claim 1, wherein the first leg piece and the second leg piece extend in a direction substantially perpendicular to a central axis of the metal core.

4. The steering switch assembly structure according to claim 3, wherein the switch assembly can be mounted and dismounted only along the direction in which the first leg piece extends.

5. The steering switch assembly structure according to claim 1, wherein the switch assembly has a mount slot for receiving the first leg piece.

6. The steering switch assembly structure according to claim 1, further comprising an engaging mechanism which operates to prevent detachment of the switch assembly mounted at the first leg piece.

7. The steering switch assembly structure according to claim 1, wherein a pre-load is applied to the elastic element at a time of assembly.

8. A steering switch assembly structure comprising:
   a metal core of a steering wheel;
   a bracket having a first leg piece and a second leg piece spaced a predetermined distance from the first leg piece, the bracket being fixed to the metal core;

a horn pad having a projection capable of translatory reciprocal movement between the first leg piece and the second leg piece;

an elastic element interposed between the projection and the second leg piece for urging the projection in a direction of the reciprocal movement toward the first leg piece; and a switch assembly mounted at the first leg piece and against which the projection is caused to constantly abut by urging of the elastic element.

9. The steering switch assembly structure according to claim 8, wherein a direction in which the horn pad and the projection reciprocate and a direction in which the urging acts are both substantially parallel to a central axis of the metal core.

10. The steering switch assembly structure according to claim 8, wherein the first leg piece and the second leg piece extend in a direction substantially perpendicular to a central axis of the metal core.

11. The steering switch assembly structure according to claim 10, wherein the switch assembly can be mounted and dismounted only along the direction in which the first leg piece extends.

12. The steering switch assembly structure according to claim 8, wherein the switch assembly has a mount slot for receiving the first leg piece.

13. The steering switch assembly structure according to claim 8, further comprising an engaging mechanism which operates to prevent detachment of the switch assembly mounted at the first leg piece.

14. The steering switch assembly structure according to claim 8, wherein a pre-load is applied to the elastic element at a time of assembly.

15. A steering switch assembly structure comprising:

a metal core of a steering wheel;

a bracket mounted to the metal core, said bracket having a portion that extends in a direction substantially perpendicular to a central axis of the metal core;

a switch assembly; and a non-screwing fastener for mounting the switch assembly to the bracket, wherein said non-screwing fastener mounts said switch assembly to said bracket portion as a result of said switch assembly being slid along said bracket portion in said substantially perpendicular direction.

16. The steering switch assembly structure according to claim 15, wherein the switch assembly can be mounted and dismounted only along the direction in which the portion of the bracket extends.

17. The steering switch assembly structure according to claim 15, wherein the non-screwing fastener comprises a mount slot which receives the portion of the bracket.

18. The steering switch assembly structure according to claim 15, wherein the non-screwing fastener comprises an engaging mechanism which operates to prevent detachment of the mounted switch assembly.

19. The steering switch assembly structure according to claim 18, wherein the engaging mechanism comprises a notch portion at a portion of the bracket and a pawl on the switch assembly.

20. A steering vehicle assembly structure comprising:

a metal core of a steering wheel;

a bag body disposed over said metal core;

a pad member covering said bag body;

a bracket mounted to the metal core and having a portion disposed outside of said pad member and extending in a direction substantially perpendicular to a central axis of the metal core;

a switch assembly, and a non-screwing fastener for mounting the switch assembly to the bracket portion.

21. The steering vehicle assembly structure according to claim 20, wherein said non-screwing fastener mounts said switch assembly to said bracket portion as a result of said switch assembly being slid along said bracket portion in said substantially perpendicular direction.

22. The steering vehicle assembly structure according to claim 20, wherein the non-screwing fastener comprises an engaging mechanism which operates to prevent detachment of the mounted switch assembly; and the engaging mechanism comprises a notch portion at a portion of the bracket and a pawl on the switch assembly.

* * * * *